United States Patent
Winter (12)

(10) Patent No.: US 6,284,695 B1
(45) Date of Patent: Sep. 4, 2001

(54) METHOD FOR REJUVENATING SOLID PARAXYLENE ADSORBENT

(75) Inventor: George Winter, Arlington Heights, IL (US)

(73) Assignee: Denim Engineering, Inc., Park Ridge, IL (US)

(*) Notice: Subject to any disclaimer, the term of this patent is extended or adjusted under 35 U.S.C. 154(b) by 0 days.

(21) Appl. No.: 09/415,717

(22) Filed: Oct. 12, 1999

(51) Int. Cl.$^7$ .............................. B01J 38/48; B01J 20/34

(52) U.S. Cl. ................................................ 502/22; 502/29

(58) Field of Search .................. 502/22, 29, 20; 585/820, 826, 828

(56) References Cited

U.S. PATENT DOCUMENTS

| 3,686,343 | * | 8/1972 | Bearden, Jr. et al. . |
| 4,043,938 | * | 8/1977 | Reif et al. . |
| 4,705,909 | * | 11/1987 | Yan . |
| 5,449,853 | * | 9/1995 | Lansbarkis et al. . |
| 5,948,950 | * | 9/1999 | Hotier et al. . |

* cited by examiner

Primary Examiner—Steven P. Griffin
Assistant Examiner—Christina Ildebrando
(74) Attorney, Agent, or Firm—Kajane McManus

(57) ABSTRACT

The method for rejuvenating solid paraxylene adsorbent comprises the steps of varying the water injection rate above a predetermined minimum level in a non-linear fashion for a time sufficient to produce rejuvenation of the adsorbent and if desired, adding at least one polar organic compound to the water being injected.

10 Claims, No Drawings

METHOD FOR REJUVENATING SOLID PARAXYLENE ADSORBENT

BACKGROUND OF THE INVENTION

1. Field of the Present Invention

The method of the present invention rejuvenates solid paraxylene adsorbent, often referred to as an adsorbent bed, improving output yield of the monomer. More particularly, the method proposes flushing increased levels of water, with a polar organic compound therein, if desired, through aged adsorbent in an adsorption separator to effectively increase functionality of the adsorbent in removing paraxylene from a mixed monomer stream.

2. Description of Prior Art

Starting in the early 1970's, the use of solid adsorbents to extract paraxylene from mixtures of paraxylene, metaxylene, orthoxylene and ethylbenzene was introduced, with most presently existing plants using the adsorption technology. In such systems, the adsorbent is held stationary in liquid filled chambers and external liquid phase streams are manipulated to simulate a moving bed process. Feeds are derived from the fractionated (and sometimes extracted) high severity reforming of virgin naphthas. Desorbents include toluene, mixed diethylbenzene and paradiethylbenzene.

It has further been taught that continuous injection of a constant small amount of water is required to maintain the selectivity of the adsorbent with typical injection rates centering around 200 wt PPM of the liquids flowing to the adsorbent. In fact, changing the injection rate of water is claimed to have a deleterious effect on selectivity and recovery. Thus, according to the prior art, the optimum water injection rate is a constant 200 wt PPM. An exemplary teaching may be found in the Yan U.S. Pat. No. 4,705,909.

Further, such solid adsorbents typically have required replacement upon aging, the adsorbent losing effectivity over a period of 5 to 10 years of use.

To replace the adsorbent, the production of paraxylene must be stopped for about two months. First, the hydrocarbons must be removed using procedures that require at least one week of elapsed time. Second, the used adsorbent must be unloaded, a three to four week effort. Usually, the internals in the adsorbent chambers are also removed and repaired, further lengthening the down time. Finally, expensive new adsorbent and the repaired internals are loaded into the adsorbent chambers. Because of the costs, it can easily require several years to recover the combination of lost production for the two month period and the cost of the new adsorbent.

Thus, it will be understood that development of a method for extending the useful life of adsorbent by rejuvenating same would be crucial to production of paraxylene.

SUMMARY OF THE INVENTION

Accordingly it is a primary object of the method of the present invention to rejuvenate the adsorbent and extend the useful life thereof.

Further, it is an object to provide a method by which increased production of paraxylene product can be accomplished simply.

These as well as other objects of the invention are met by the method proposed herein which includes the steps of varying the water injection rate for a period of time sufficient to rejuvenate the adsorbent, and, if desired, adding at least one polar organic compound to the water being injected.

DESCRIPTION OF THE PREFERRED EMBODIMENT

Unexpected experimental results were obtained recently which included improved paraxylene recovery without decreasing selectivity, and extending the useful life of the adsorbent during several experiments conducted.

A first experiment examined the level of paraxylene recovery at different water injection rates.

A second experiment was conducted to examine the effect of periodically varying the water injection rate.

And a third experiment was conducted to examine what effect, if any, the addition of various chemical compounds to the water being injected would produce with regard to improving paraxylene recovery.

The experiments were conducted at two plants utilizing adsorption technology for recovery of paraxylene and will be identified as Plant A and Plant B in the descriptions following:

PLANT A

In Plant A, the first set of experiments varied the water injection rate as the solid adsorbent aged. At four years of age, doubling the water injection rate increased the recovery of paraxylene by several percent, but, after a few weeks, had a deleterious effect on purity and recovery.

The purity and recovery of the paraxylene increased when the water injection rate was reduced back to 200 wt PPM. When the purity of the paraxylene was returned to the original value, the recovery of paraxylene was clearly higher than before the water injection rate was doubled. Thus, for the first time, the possible benefit of a variable water injection rate was observed. In view of the literature and advice from the process developer and other published information, this result was most unexpected.

At five years of age, doubling the water injection rate for two weeks produced the same beneficial effects. As in year four, the recovery and purity decreased while the water injection was at 400 wt PPM. When the water injection rate was returned to 200 wt PPM, the purity and recovery improved to almost start-of-run performance. Thus, once again, the unexpected result of increasing both recovery and purity was seen when non-linear water injection rates were used.

At six years of age, based on laboratory tests, a polar organic compound was added to the water injection tank. In the particular set of tests run, the polar organic compound selected for use was tetrahydrothiophene 1-1 dioxide, commonly called sulfolane. At 300 wt PPM water plus sulfolane, the improvement in the performance of the solid adsorbent was faster and the temporary loss of purity and recovery was not as severe. It appeared that about half the time was needed for the adsorbent to produce higher recovery. Once the sulfolane was removed from the injection water and the rate was returned to 200-wt PPM, the performance of the adsorbent returned to start-of-run performance. It has further been established through empirical testing that the method will provide improved extraction when applied for a period of time equaling a complete cycle of a controller for the bed of solid adsorbent to be rejuvenated.

PLANT B

In Plant B, after several years of operation, the recovery of paraxylene had declined. During the experiment, sulfolane was added to the injection water system. At 250 wt PPM sulfolane plus water, the recovery of paraxylene improved while the purity decreased only slightly. After several weeks, the injection system was returned to 200 wt PPM of water, the purity of the paraxylene returned to its original value, and the recovery improved. At the end, the improvement in recovery appeared to return the adsorbent to its capabilities when it was new.

The improvement possible with sulfolane is believed to be due to its combination of polarity and solubility for hydrocarbons. The use of other compounds similar to sulfolane is still being investigated.

The usefulness of these finding include the higher production rates made possible by using nonlinear rates for the water injection and mixtures of water and polar organic compounds such as sulfolane, and elimination of downtime necessary to change the solid adsorbent after only 5 to 10 years of use, this last item being crucial to paraxylene production.

As described above, the method of the present invention provides a number of advantages, some of which have been described above and others of which are inherent in the invention. Also, modifications may be proposed without departing from the teachings herein. Accordingly, the scope of the invention is only to be limited as necessitated by the accompanying claims.

What is claimed is:

1. A method for rejuvenating solid paraxylene adsorbent bed by varying a rate at which water is injected across the adsorbent bed above a minimum level sufficient to produce rejuvenation of the adsorbent bed and for a period of time sufficient to produce rejuvenation of the adsorbent.

2. The method of claim 1 wherein the minimum level of water injection rate is greater than 200 wt PPM.

3. The method of claim 1 wherein the rate is varied in a nonlinear manner.

4. The method of claim 1 wherein the period of time is at least one complete cycle of a controller for the adsorbent bed.

5. A method for rejuvenating solid paraxylene adsorbent bed by varying a rate at which water is injected across the adsorbent bed above a minimum level sufficient to produce rejuvenation of the adsorbent bed and for a period of time sufficient to produce rejuvenation of the adsorbent and adding a minimum amount of at least one polar organic compound to the water being injected.

6. The method of claim 5 wherein the minimum level of water injection rate is greater than 200 wt PPM.

7. The method of claim 5 wherein the rate is varied in a nonlinear manner.

8. The method of claim 5 wherein the period of time is at least one complete cycle of a controller for the adsorbent bed.

9. The method of claim 5 wherein one polar organic compound added to the water is tetrahydrothiophene 1-1 dioxide.

10. The method of claim 5 wherein the minimum amount of polar organic compound added to the water is 250 PPM.

* * * * *